_United States Patent Office_ 2,913,452
Patented Nov. 17, 1959

2,913,452

DIAMIDES OF HETEROCYCLIC HYDROXY AMINES AND ESTERS THEREOF

John D. Zech, Wilmington, Del., assignor to Atlas Powder Company, Wilmington, Del., a corporation of Delaware No Drawing. Application July 29, 1957
Serial No. 674,588

10 Claims. (Cl. 260—211)

This application is a continuation-in-part of application Serial No. 360,586, filed June 9, 1953, now abandoned.

The application relates to new chemical compounds which are diamides of anhydro hexityl amines.

It is an object of the invention to provide diamides of anhydro hexityl amines which are useful as chemical intermediates in the preparation of valuable corrosion inhibiting compounds.

Another object is to provide fatty acid esters of anhydro hexityl amine diamides which are valuable corrosion inhibitors.

A further object is to provide processes for preparing condensation products comprising diamides of the aforesaid nature and esters thereof.

The above and other objects will become more apparent in the course of the following description of the invention and in the appended claims.

The aforesaid diamides are condensation products obtained by reacting two molar proportions of a secondary hexityl amine with one molar proportion of a dibasic carboxylic acid at a temperature of from about 170° C. to about 210° C. until from 4 to 6 molar proportions of water of reaction have been evolved. The resulting products are mixtures of compounds. The carboxyl radicals have, for the most part, been converted to amide groups with only a minor proportion of esterification of the hexityl amine hydroxyls. According to the reaction proportions recited only two molar proportions of evolved water result from condensation of the carboxyl group, i.e., from amide and ester formation. The remaining portion of the water evolved is the result of inner ether formation in the hexityl radical to form heterocyclic oxygen-containing rings with the elimination of water. From each molar proportion of hexityl amine it is possible to form any of several 4-, 5-, or 6-membered rings by the loss of one molar proportion of water of anhydrization and, under the conditions of reaction recited, more than one of such mono anhydro inner ether species are produced in the reaction mixture. If the heating is continued until a second molar proportion of water of anhydrization is driven off the resulting inner ether radicals are bicyclic in structure. Such radicals are designated dianhydro hexityl radicals. It is thus seen that the predominating components of the condensation products are diamides of anhydro secondary hexityl amines, and they will be so-designated herein.

The said diamides of anhydro secondary hexityl amines contain available hydroxyl groups and may be esterified with monobasic carboxylic acids to yield valuable products, which products are within the purview of this invention. From the diamides of mono anhydro secondary hexityl amines there may be obtained partial or complete esters depending on whether one, two, or all three of the hydroxyl groups of the anhydro hexityl radical are esterified. The diamides of dianhydro secondary hexityl amines permit of esterification with only one acid group per anhydro hexityl residue.

The said esters of diamides of anhydro hexityl amines may be prepared by direct esterification of the preformed diamide with a mono basic carboxylic acid under esterification conditions appropriate to the chosen acid. In the interest of conserving reaction time when preparing esters of high boiling acids the mono basic acid may, if desired, be introduced into the reaction mixture after the dibasic acid has been substantially converted to amide but before the hexityl radicals have been completely converted to anhydro hexityl radicals. The reaction temperature may then be maintained in the range of 170° to 210° C. whereupon esterification and anhydrization will proceed simultaneously to yield the ester of the anhydro hexityl amine.

By way of illustrating the invention, the following examples are presented:

*Example 1*

196 gms. of N-methyl glucamine was melted and 282 gms. of di-linoleic acid that had been preheated to 90° C. was added gradually with stirring. The temperature was raised to 190° C. and then maintained at 190° to 195° C. for 2½ hours. The product was a stiff brown wax-like material with surface active properties. It had an acid number of 7.4 and a hydroxyl number of 381.

*Example 2*

195 gms. of N-methyl glucamine was melted and to it was added 73 gms. of adipic acid. The temperature of the reaction mass was raised to 187° C. and held there for 2¼ hours. During this period the temperature ranged from 184° to 195° C. At the end of the indicated period two moles of water had been removed. The product, a soft resinous, water soluble material, was a di-adipamide of N-methyl, N-mono-anhydro glucyl amine.

*Example 3*

195 gms. of N-methyl glucamine was melted and to it was added 67 gms. of diglycollic acid. The temperature was raised to 180° to 210° C. and held there for 5 hours. At the end of this time three moles of water had been removed. The product was a di-glycollic acid amide of N-methyl, N-di-anhydro glucyl amine.

*Example 4*

195 gms. of N-methyl glucamine was melted and to it was added 94 gms. of azelaic acid. The temperature was raised to 190° to 203° C. for 2 hours. During this period of time two moles of water were given off from the reaction mass. The product having an acid number of 6.2, a saponification number of 31.8 and a hydroxyl number of 648 was a di-azelaic amide of N-methyl N-mono-anhydro glucyl amine.

*Example 5*

195 gms. (1 mol) of N-methyl glucamine were melted and 94 gms. (0.5 mol) of azelaic acid were added to the melt. The temperature was raised rapidly to 166° C. and then taken to 194° C. over a period of 30 minutes during which period one mol of water was evolved and the carboxyl groups were substantially all converted to amide. The hexityl radicals were substantially unanhydrized at this point. 282 gms. (1 mol) of oleic acid were then added and heating continued for 4.5 hours in the temperature range of 182° to 206° C. Anhydrization of the hexityl radical and esterification with oleic acid proceeded simultaneously during this period and the reaction product was the dioleate of azelaic diamide of anhydro methyl glucamine. It was a very viscous liquid, soluble in mineral oil and dispersible in water. It was found to be an excellent corrosion inhibiting agent when added to petroleum oils.

*Example 6*

195 gms. (1 mol) of N-methyl glucamine were melted and 58 gms. (0.5 mol) of fumaric acid introduced into the melt. The mixture was heated to 185° to 196° C. for 3.5 hours during which period substantially two mols of water were evolved. 21.5 gms. of the product were removed and cooled to yield a brittle resin which was the difumaric amide of N-methyl, N-mono-anhydro glucyl amine.

Example 7

To the remainder of the reaction product of Example 6 there was added 173 gms. (0.9 mol) of mixed coconut oil fatty acids and the reaction continued at 190° to 207° C. for 4.5 hours during which time 0.9 mol of water were evolved. The resulting product, the di-coconut fatty acid ester of the difumaric acid amide of N-methyl, N-anhydro hexityl amine, was a soft, water-dispersible resin.

Example 8

To 195 gms. (1 mol) of molten N-methyl there was added 101 gms. (0.5 mol) of sebacic acid. The reaction mixture was held in the temperature range of 188° to 197° C. for 3 hours during which 2 mols of water were evolved to yield the di-sebacic amide of N-methyl N-mono-anhydro hexityl amine. The product was a soft, light amber resin with a saponification number of 33 and a hydroxyl number of 653.

Example 9

All but 24.6 gms. of the product of Example 8 and 255 gms. (0.9 mol) of oleic acid were heated together for 6 hours in the temperature range of 192° to 207° C. The resulting viscous liquid product was the dioleate of the sebacic diamide of N-methyl, N-mono-anhydro glucyl amine. Its saponification number was 121 and its hydroxyl number was 205.

Example 10

95 gms. of N-methyl glucamine were melted and to this was added 74 gms. of phthalic acid. The temperature was raised to 183° to 199° C. for 3¼ hours. At the end of this period 2 moles of water had been removed. The product was the diphthalic amide of N-methyl N-mono-anhydro glucyl amine.

Example 11

195 gms. of molten N-methyl glucamine and 73 gms. of adipic acid were heated together at 185° to 195° C. for 2 hours. 360 gms. of acetic anhydride were then added and heated with the preformed diamide from 118° to 138° C. for 2 hours after which unreacted acetic anhydride and the acetic acid formed in the esterification were removed by vacuum stripping. The resulting product was water soluble and amber in color. It comprised the completely acetylated di-adipamide of mixed N-methyl, N-mono-anhydro and N-methyl, N-di-anhydro glucyl amines as indicated by the following analytical constants:

Acid number _____ 5.5
Saponification number _____ 401
Hydroxyl number _____ 5.5

Example 12

98 gms. (0.5 mol) of N-methyl glucamine and 47 gms. (0.25 mol) of azelaic acid were heated together at 200° C. for an hour after which 213 gms. (0.75 mol) of oleic acid was added and the reaction continued for 15 hours at 210° C. The resulting condensation product, predominantly the trioleate of the azelaic diamide of N-methyl, N-anhydro glucyl amine, was a dark liquid which exhibited excellent corrosion inhibiting properties. In the Static Water Drop Corrosion Test (MIL–P–17272), at the level of 0.1% in a refined mineral oil, four out of four test samples passed after 336 hours exposure.

Example 13

98 gms. (0.5 mol) of N-methyl glucamine and 37 gms. (0.25 mol) of adipic acid were heated together for 45 minutes at 200° C. after which 181 grams (0.64 mol) oleic acid were added and heating at 195° to 200° C. continued for 19 hours. The resulting liquid condensation product comprising di- and tri-oleates of the di-adipamide of N-methyl, N-anhydro glucyl amines, was likewise found to be an excellent corrosion inhibiting agent for mineral oil.

Example 14

98 gms. (0.5 mol) of N-methyl glucamine and 51 gms. (0.25 mol) of sebacic acid were heated together for one hour at 190° to 195° C. after which 181 gms. (0.64 mol) of oleic acid were added and heating continued at 200° C. for 17 hours. The resulting condensation product, like those of the preceding two examples, was an excellent corrosion inhibiting agent.

Example 15

98 gms. (0.5 mol) of N-methyl glucamine and 30 gms. (0.25 mol) of succinic acid were heated together for 1 hour at 200° C. after which 181 gms. (0.64 mol) of oleic acid were added and the heating continued at 200° to 210° C. for 10.5 hours. The resulting liquid condensation product, comprising mixed di- and tri-oleates of the disuccinamide of N-methyl, N-anhydro glucyl amine, was also an excellent corrosion inhibiting agent.

In the foregoing examples N-methyl glucamine has been employed as illustrative of the secondary hexityl amines which may be condensed with dibasic acids to form diamides. Analogous condensation products may be obtained in accordance with the invention by substituting equimolar quantities of other secondary amines for N-methyl glucamine in any of the examples. By way of further illustration the hexityl radical may instead of glucyl be fructyl and the secondary N-substituent may be any radical which is inert to the reacting acids. Particularly it may be alkyl, for example; ethyl, propyl, lauryl, or cetyl; or alkenyl, for example; allyl or octadecenyl; or cycloalkyl, for example; cyclohexyl; or aryl, or aralkyl, for example; phenyl or benzyl.

The dibasic acids are dicarboxylic acids and may be either saturated or unsaturated, unsubstituted or substituted with radicals inert with respect to amine and/or hydroxyl groups, aliphatic, cycloaliphatic or aromatic.

Suitable monobasic acids for preparaing esters of the diamides in accordance with the invention include saturated and unsaturated aliphatic acids such as the acids of the naturally occurring fats and oils; acids obtained by the oxidation of petroleum hydrocarbons; short chain fatty acids such as acetic or propionic; resin acids; mixed resin and fatty acids, for example, tall oil; and acids of the aromatic series, such, for example, as benzoic. A preferred class of monobasic acid, especially for preparing corrosion inhibiting ester-diamides, comprises the acids of the naturally occurring fats and oils.

What is claimed is:

1. The process of preparing a condensation product which comprises heating two molar proportions of a secondary hexityl amine with one molar proportion of a dibasic carboxylic acid in the temperature range of from 170° C. to 210° C. until from 4 to 6 molar proportions of water have been evolved from the reaction mixture.

2. The process of preparing a condensation product which comprises heating two molar proportions of a secondary hexityl amine with one molar proportion of a dibasic carboxylic acid in the temperature range of from 170° C. to 210° C., until from 4 to 6 molar proportions of water have been evolved and esterifying at least part of the residual hydroxyls with a monobasic carboxylic acid.

3. The process of preparing a condensation product which comprises heating two molar proportions of N-methyl glucamine with one molar proportion of a dibasic carboxylic acid in the temperature range of from 170° C.

to 210° C., until from 4 to 6 molar proportions of water have been evolved.

4. The process of preparing a condensation product which comprises heating two molar proportions of N-methyl glucamine with one molar proportion of a dibasic dicarboxylic acid in the temperature range of from 170° C. to 210° C., until from 4 to 6 molar proportions of water have been evolved and esterifying at least part of the residual hydroxyls with a monocarboxylic acid.

5. The process of preparing a condensation product comprising the azelaic diamide of N-methyl, N-anhydro glucyl amine which comprises heating two molar proportions of N-methyl glucamine with one molar proportion of azelaic acid in the temperature range of 170° C. to 210° C., until from 4 to 6 molar proportions of water have been evolved.

6. The process of preparing a condensation product comprising the dioleate of the azelaic diamide of N-methyl, N-anhydro glucyl amine which comprises heating two molar proportions of N-methyl glucamine with one molar proportion of azelaic acid in the temperature range of 170° C. to 210° C. until the azelaic acid is substantially completely amidated, adding 2 molar proportions of oleic acid and continuing the heating until the oleic acid is esterified and the hexityl radicals have been dehydrated to anhydro glucyl radicals.

7. A condensation product comprising a member selected from the group consisting of dicarboxylic acid diamides of secondary anhydro hexityl amines and monocarboxylic acid esters of said diamides.

8. A condensation product comprising a member selected from the group consisting of dicarboxylic acid diamides of N-methyl N-anhydro glucyl amines and monocarboxylic fatty acid esters of said diamides.

9. The azelaic diamide of N-methyl N-mono-anhydro glucyl amine.

10. The dioleate of azelaic diamide of N-methyl, N-mono-anhydro glucyl amine.

References Cited in the file of this patent

UNITED STATES PATENTS

| | | |
|---|---|---|
| 1,985,424 | Piggott | Dec. 25, 1934 |
| 2,094,608 | Kritchevsky | Oct. 5, 1937 |